United States Patent [19]

Armstrong et al.

[11] Patent Number: 4,581,392

[45] Date of Patent: Apr. 8, 1986

[54] HOT MELT GLASS FIBER COATING

[75] Inventors: Gordon P. Armstrong, Newark; Martin C. Flautt; Jean-Claude Pollet, both of Granville, all of Ohio

[73] Assignee: Owens-Corning Fiberglas Corporation, Toledo, Ohio

[21] Appl. No.: 613,846

[22] Filed: May 24, 1984

[51] Int. Cl.$^4$ .............................................. C08K 9/06
[52] U.S. Cl. .................................. 523/209; 428/391; 428/407; 524/488; 524/489
[58] Field of Search ................ 525/487, 488; 523/209; 524/488, 489; 428/391, 407

[56] References Cited

U.S. PATENT DOCUMENTS

| | | |
|---|---|---|
| 2,794,759 | 6/1957 | Dildilian .............................. 154/101 |
| 3,273,987 | 9/1966 | Marzocchi et al. ..................... 65/60 |
| 3,615,106 | 10/1971 | Flanagan et al. . | |
| 3,929,938 | 12/1975 | White et al. . | |
| 4,006,272 | 2/1977 | Sakaguchi et al. ................ 428/268 |
| 4,056,651 | 11/1977 | Scola ................................... 428/336 |
| 4,127,619 | 11/1978 | Godfrey . | |
| 4,136,069 | 1/1979 | Vachon et al. ..................... 428/375 |
| 4,167,433 | 9/1979 | Lakshmanan . | |
| 4,299,745 | 11/1981 | Godfrey . | |
| 4,316,929 | 2/1982 | McIntire et al. .................... 428/262 |
| 4,394,475 | 7/1983 | Temple et al. ...................... 524/262 |

Primary Examiner—John C. Bleutge
Assistant Examiner—Robert E. L. Sellers, II
Attorney, Agent, or Firm—Ronald C. Hudgens; Greg Dziegielewski; Patrick P. Pacella

[57] ABSTRACT

A non-aqueous hot melt coating for glass fibers consisting of a silane, an ethylene-ethyl acrylate copolymer, a microcrystalline wax, a phenolic-modified terpene resin and a chemically modified polyolefin for coating glass fibers which can be employed as resin reinforcement.

10 Claims, No Drawings

HOT MELT GLASS FIBER COATING

TECHNICAL FIELD

This invention relates to hot melt glass fiber coatings.

In one of its more specific aspects, this invention relates to hot melt, non-aqueous coatings which can be applied to glass fibers in forming.

BACKGROUND OF THE INVENTION

The production of elongated glass fibers and their incorporation into various resins for reinforcing purposes is well known. Generally, such fibers have an aqueous based size applied to their surface and the fibers are then wound into a package. The packages are dried for the purpose of eliminating moisture after which the fibers can be used for reinforcement purposes, either in continuous lengths or as cut fibers in resins such as polypropylene, polyesters, and the like.

Considerable time and expense would be saved if a size could be employed which, while requiring no drying, could be directly blended into the resin and molded therewith to provide satisfactory reinforcement.

This invention is directed to that objective.

STATEMENT OF THE INVENTION

According to this invention, there is provided a non-aqueous hot melt coating for glass fibers consisting of a silane, an ethylene-ethyl acrylate copolymer, a microcrystalline wax, a phenolic-modified terpene resin and a chemically modified polyolefin.

Also according to this invention, there is provided a glass fiber coated with the above-described hot melt coating and a resin reinforced with the coated glass fiber.

Also according to this invention, there is provided a resin reinforced with a glass fiber coated with the above-described hot melt coating.

DESCRIPTION OF THE INVENTION

The invention is employable with any glass conventionally employed as reinforcement of resins. Similarly, the glass can be employed to reinforce any resins including polyolefins, polyesters, polypropylene, and the like.

The hot melt size of this invention is a 100 percent solids formulation applied as a hot melt to the glass fibers as they are formed, that is, at or about the place in their formation at which aqueous sizes are applied, that is, between the bushing and the collet on which the fibers are wound as a package.

Any suitable silane conventionally employed in aqueous based glass sizes can be employed including gamma-methacryloxypropyl trimethoxysilane and gamma-aminopropyl triethoxysilane. The gamma-methacryloxysilane is preferred and it will be employed in an amount within the range of from about 0.1 to about 4 weight percent of the coating and preferably in an amount of about 2 weight percent.

Any suitable ethylene-ethyl acrylate copolymer can be employed. Preferably, the copolymer will have a melt index (ASTM D1238 gram,/10 minutes) of about 20, a density of about 0.93 g/cc., a flexural modulus and secant modulus of elasticity of about 9,000 and 4,300, respectively (determined on 0.075 inch compression molded plaques), an ultimate elongation, of about 750%, a tensile strength of about 700 psi and a Durometer Hardness "A" of about 86.

The ethylene-ethyl acrylate copolymer will be employed in an amount within the range of from about 5 to about 35 weight percent and preferably in an amount of about 19.5 weight percent.

One suitable ethylene-ethyl acrylate copolymer is Bakelite DPDA-9169 available from Union Carbide Corporation, Danbury, Conn.

Any suitable microcrystalline wax can be employed. Preferably, the wax will have a melting point of about 200° F., a penetration (ASTM D-1321 at 77° F.) of about 0.5 mm, a SUS Viscosity (ASTM D-88 at 210° F.) of about 78, a viscosity (ASTM D-3236) of about 11.7 cps, and a specific gravity at 75° F. of about 0.93.

One particularly suitable microcrystalline wax is Petrolite® C-1035 available from Bareco, a Division of Petrolite Corp., Tulsa, Okla.

The microcrystalline wax will be contained in the composition in an amount within the range of from about 10 to about 80 weight percent and preferably in an amount of about 39 weight percent.

Any suitable phenolic-modified terpene resin can be employed. The resin should be highly alkylated, nonreactive, thermoplastic and methylol-free. Preferably, also, the resin will have a Ring and Ball softening point of about 135° C., a viscosity at 25° C. (70% solids solution in toluene) of V, a density at 25° C. of about 8.6 #/cu. ft., a flashpoint, COC, of about 515° F. and melt viscosities at 220° C., 190° C., and 165° C. of about 1 poise, 10 poises and 100 poises, respectively.

One particularly suitable resin is Piccofyn® Resin A135 available from Hercules, Inc., Wilmington, Del.

The phenolic modified terpene resin will be incorporated in the composition in an amount within the range of from about 5 to about 60 weight percent and preferably in an amount of about 19.5 weight percent.

Any suitable chemically modified polyolefin can be employed. Preferably, the polyolefin will have a weight average molecular weight of about 4,500, a Ring and Ball softening point of about 157° C., a penetration (ASTM D5, 100 g for 5 s at 25° C.) of 0.1 mm, a density of about 0.93 g/cc., will be solid up to above 302° F. and will have a Brookfield Viscosity (Thermosel) of about 400 cps at 190° C.

One particularly suitable chemically modified polyolefin is Epolene E-43, an emulsifiable wax, available from Eastman Chemical Products, Inc., Kingsport, Tenn.

The chemically modified polyolefin will be employed in an amount within the range of from about 1 to about 60 weight percent and preferably in an amount of about 20 weight percent.

The composition of this invention is best produced by blending all materials in their liquid stage with agitation.

The uniform coating can be applied to the glass in the form of one or more filaments in any suitable manner. The glass can be drawn through a bath of the composition or the composition can be padded or rolled on. Thereafter, the strand is processed in any desired manner.

Glass sized with the coating of this invention is particularly suitable for reinforcing resins such as polypropylene, polyesters and the like.

It will be evident from the foregoing that various modifications can be made to the method of this invention. Such, however, are within the scope of the invention.

We claim:

1. A non-aqueous coating for glass fibers consisting of an organosilane, an ethylene-ethyl acrylate copolymer, a low molecular weight polyethylene wax, a phenolic-modified terpene resin and an emulsifiable polyolefin, wherein said coating is 100% solids prior to application to surfaces of the glass fibers and wherein the coating is applied to the glass fiber surfaces in the form of a hot melt.

2. The coating of claim 1 in which said silane is gamma-methacryloxysilane.

3. The coating of claim 1 in which said ethylene-ethyl acrylate copolymer has a melt index of about 20.

4. The coating of claim 1 in which said low molecular weight polyethylene wax is a microcrystalline wax having a melting point of about 200° F.

5. The coating of claim 1 in which said emulsifiable terpene resin is highly alkylated, nonreactive, thermoplastic and methylol-free.

6. The coating of claim 1 in which the chemically modified polyolefin has a weight average molecular weight of about 4,500 and an acid number between about 45 and about 90.

7. The coating of claim 1 consisting in parts by weight (pbw), of about 0.1 to about 4 pbw organosilane, about 5 to about 35 pbw ethylene-ethyl acrylate, about 10 to about 80 pbw low molecular weight polyethylene wax, about 5 to about 60 pbw phenolic-modified terpene resin and about 1 to 60 pbw of an emulsifiable polyolefin.

8. The coating of claim 1 in which said composition consists in parts by weight of the following:

| | |
|---|---|
| organosilane | 2.0 |
| ethylene-ethyl acrylate | 19.5 |
| low molecular weight polyethylene wax | 39.0 |
| phenolic modified terpene resin | 19.5 |
| emulsifiable polyolefin | 20.0 |

9. A glass strand having on its surface a coating consisting of an organosilane, an ethylene-ethyl acrylate copolymer, a low molecular weight polyethylene wax, a phenolic-modified terpene resin, and an emulsifiable polyolefin, wherein the coating is 100% solids prior to application to the glass strand and is applied to the glass strand in the form of a hot melt.

10. A resin reinforced with a glass strand, said glass strand having on its surface a coating consisting of an organosilane, an ethylene-ethyl acrylate copolymer, a low molecular weight polyethylene wax, a phenolic-modified terpene resin and an emulsifiable polyolefin, wherein the coating is 100% solids prior to application to the glass strand and is applied to the glass strand in the form of a hot melt.

* * * * *